United States Patent [19]

Verrall et al.

[11] Patent Number: 5,632,929
[45] Date of Patent: May 27, 1997

[54] LIQUID CRYSTAL POLYMERS

[75] Inventors: Mark A. Verrall; Owain L. Parri; David Coates, all of Poole, United Kingdom

[73] Assignee: The Secretary of State for Defence in Her Britannic Majesty's Government of the United Kingdom of Great Britain and Northern Ireland, United Kingdom

[21] Appl. No.: 347,373

[22] PCT Filed: May 19, 1993

[86] PCT No.: PCT/GB93/01017

§ 371 Date: Dec. 6, 1994

§ 102(e) Date: Dec. 6, 1994

[87] PCT Pub. No.: WO93/25633

PCT Pub. Date: Dec. 23, 1993

[30] Foreign Application Priority Data

Jun. 5, 1992 [GB] United Kingdom ............. 9212013

[51] Int. Cl.[6] .................. C09K 19/52; C09K 19/12
[52] U.S. Cl. ............... 252/299.01; 252/299.66
[58] Field of Search ............ 252/299.01, 299.66

Primary Examiner—Cynthia Harris Kelly
Attorney, Agent, or Firm—Nixon & Vanderhye

[57] ABSTRACT

A novel LCP material based on forked side chain acrylates is disclosed having a general formula I;

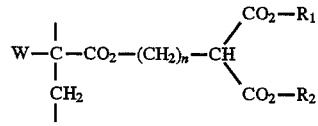

wherein W=H, $CH_3$, Cl $R_1$ and $R_2$ may or may not be the same but have the following general structure:

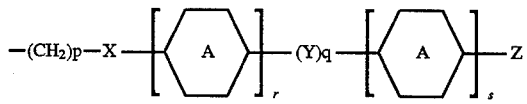

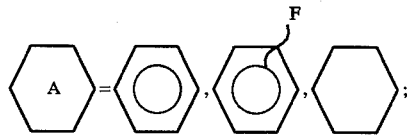

p=2 to 14;
q=0 or 1;
r=1 or 2;
s=1 or 2;
X=O, $CO_2$, $O_2C$, $CH_2$;
Y=$C_2H_4$, O, $CO_2$, $O_2C$;
Z=CN, halogen, R, $CO_2R$, OR, $O_2CR$, wherein R=chiral or achiral.

2 Claims, No Drawings

LIQUID CRYSTAL POLYMERS

This application is a 371 of PCT/GB93/01017,

This invention concerns novel liquid crystal polymer (LCP) materials and method for preparing same.

LCP's are known and are used in the electro-optical device industry, for example, in optical storage devices, in non-linear optical devices and in pyroelectric devices, see for example, GB 2146787 A and Makromoi Chem, 186 2639–2647, 1985.

One known type of LCP consists of a polymeric backbone to which are attached pendant side chains which have a chemical structure that is mesogenic, ie. that induces liquid crystalline character, these being known as side chain liquid crystal polymers. Work in this field has identified a large number of side chain structures which are suitable, see for example GB 2146787 A. For some purposes it is desirable that the LCP shows a smectic C (Sc) or chiral smectic C (Sc*) liquid crystal phase, and a particularly preferred side chain for acheiving this is one which contains a laterally fluorinated biphenyl or terphenyl system.

Liquid crystal polyacrylates are known, Polymer Communications, 24, 364–365, 1988, having a polyacrylate backbone, eg. polymethacrylate, with pendent side chains, ie. of general structure:

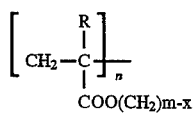

Where $(CH_2)m-X$ is the side chain and R is hydrogen or alkyl in the case of polyalkylacrylacrylates, being methyl in polymethacrylates.

According to the present invention there is provided a novel LCP material based on forked side chain acrylates having improved liquid crystal properties over known polyacrylates of similar structure, having a general formula I;

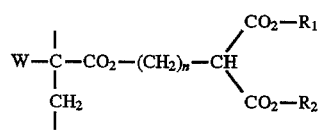

wherein W=H, $CH_3$, Cl $R_1$ and $R_2$ may or may not be the same but have the following general structure:

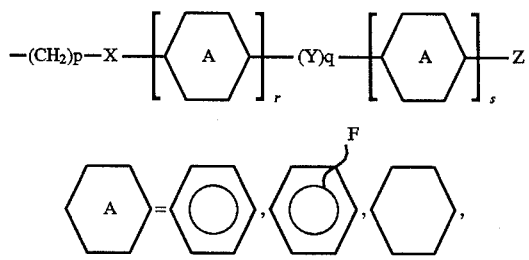

p=2 to 14;
q=0 to 1;
r=1 or 2;
s=1 or 2;
X=O, $CO_2$, $O_2C$, $CH_2$;
Y=$C_2H_4$, O, $CO_2$, $O_2C$;
Z=CN, halogen, R, $CO_2R$, OR, $O_2CR$, wherein R=chiral or achiral.

The general method of preparation of LCP's of formula I is by polymerisation of a compound of general structure:

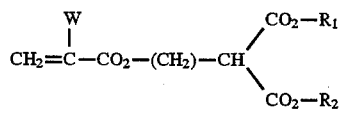

Wherein $R_1$ and $R_2$ have the general structure defined above.

EXAMPLE 1

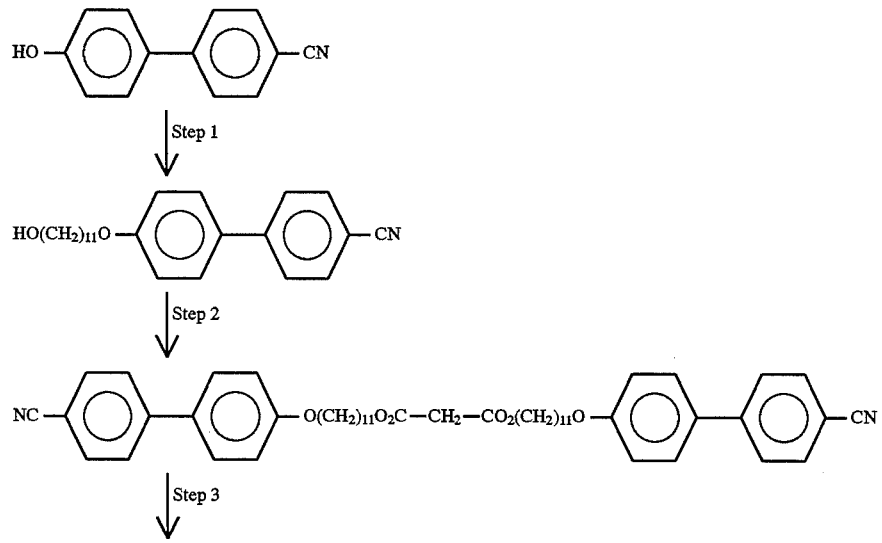

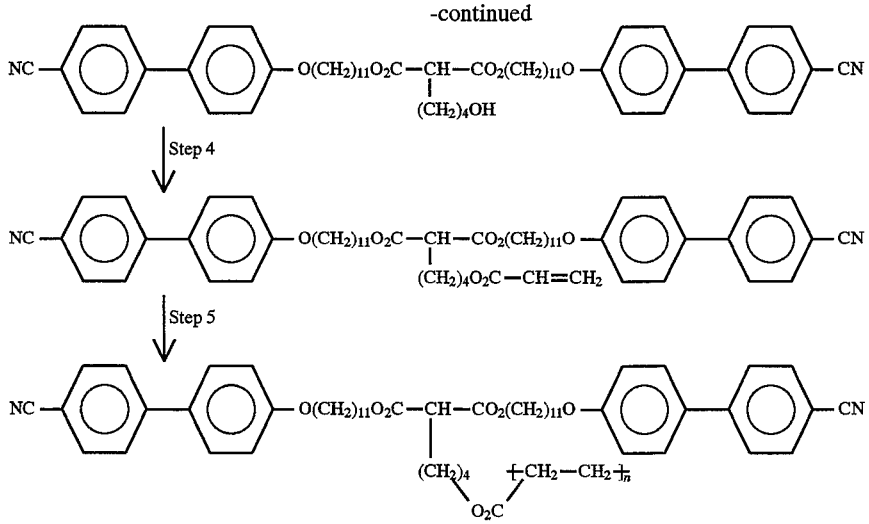

Step 1

4-hydroxy-4'cyanobiphenyl was refluxed with 11-bromo-1-undecanol and potassium carbonate in butanone fo 20 hours. The product was extracted from water into dichloromethane, and purified by recrystallisation from IMS.

Step 2

The product from step 1 was stirred at room temperature with malonic acid in the presence of excess dicyclohexyl-carbodiimide and dimethylaminopyridine in dichloromethane for 24 hours. The product was recrystallised from ethanol.

Step 3 (proposed step)

The product of step 2 is refluxed for 8 hours with 4-bromobutanol and sodium ethoxide in ethanol. The product is purified by recrystallisation and/or column chromatography on silica.

Step 4 (Known method step)

The product from step 3 is refluxed gently with acryloyl chloride and triethylamine in dichloromethane for 8 hours. The product is purified by column chromatography on silica.

Step 5 (Known method step)

The acrylate monomer is stirred at 50°–70° C. in 1,2-dichloroethane with azoisobutyronitrile as initiator for 24 hours. The product is purified by precipitation from DCM/IMS.

It will be appreciated that it is not intended to limit the invention to the above example only, many variations, such as might readily occur to one skilled in the art, being possible, without departing from the scope thereof as defined by the appended claims.

We claim:

1. A LCP material based on forked side chain acrylates of the formula I;

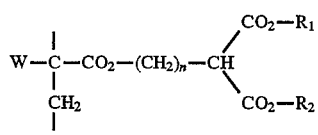

wherein W is H, CH$_3$ or Cl;

n is 0 to 14;

R$_1$ and R$_2$ may or may not be the same and have the following structure:

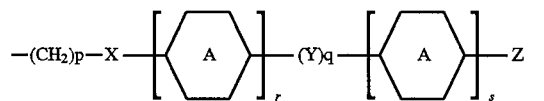

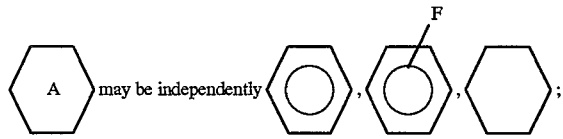

p is 2 to 14;

q is 0 to 1;

r is 1 or 2;

s is 1 or 2;

X is O, CO$_2$, O$_2$C or CH$_2$;

Y is C$_2$H$_4$, O, CO$_2$ or O$_2$C; and

Z is CN, halogen, R, CO$_2$R, OR or O$_2$CR, wherein R contains from 1 to 20 carbon atoms and may be branched or straight chain alkyl.

2. A LCP material based on forked side chain acrylates of the formula I;

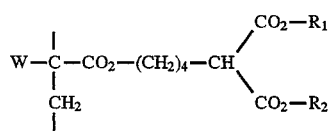

wherein W is H, CH$_3$ or Cl;

R$_1$ and R$_2$ may or may not be the same and have the following structure:

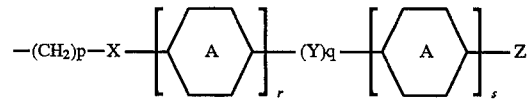

 may be independently 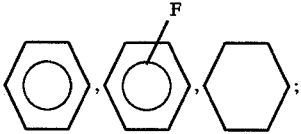;
p is 2 to 14;
q is 0 or 1;
r is 1 or 2;
s is 1 or 2;
X is O, $CO_2$, $O_2C$ or $CH_2$;
Y is $C_2H_4$, O, $CO_2$ or $O_2C$; and
Z is CN, halogen, R, $CO_2R$, OR or $O_2CR$, wherein R contains from 1 to 20 carbon atoms and may be branched or straight chain alkyl.
\* \* \* \* \*